(12) United States Patent
Kaneko et al.

(10) Patent No.: US 6,281,463 B1
(45) Date of Patent: Aug. 28, 2001

(54) POWER SUPPLY DEVICE FOR ELECTRIC DISCHARGE MACHINE

(75) Inventors: Yuji Kaneko, San Jose, CA (US); Hidetaka Hayashi, Patumthani (TH); Kuniharu Yamada, Fukui (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/544,286

(22) Filed: Apr. 6, 2000

(30) Foreign Application Priority Data

Apr. 8, 1999 (JP) .................................................. 11-101833

(51) Int. Cl.$^7$ ...................................................... B23H 1/00
(52) U.S. Cl. .......................................... 219/69.13; 307/75
(58) Field of Search ............................. 219/69.13, 69.18, 219/69.17; 307/75, 87, 48

(56) References Cited

U.S. PATENT DOCUMENTS

| 3,532,850 | * | 10/1970 | Schulz et al. ..................... 219/69.13 |
| 3,604,885 | * | 9/1971 | Inoue ................................. 219/69.18 |
| 3,832,510 | * | 8/1974 | Pfau et al. ......................... 219/69.13 |
| 3,892,936 | * | 7/1975 | Kobayashi et al. ............... 219/69.18 |
| 5,534,675 | | 7/1996 | Kaneko et al. . |
| 5,539,178 | | 7/1996 | Taneda et al. . |

\* cited by examiner

*Primary Examiner*—Shawn Riley
(74) *Attorney, Agent, or Firm*—McDermott, Will & Emery; Paul Devinsky

(57) ABSTRACT

A power supply device for an electric discharge machine for supplying power to a work gap (6) formed between a work piece and a tool electrode, includes a parallel circuit in which a first power supply (8), a second power supply (36) and a capacitor (34) are connected in parallel and the second power supply can supply a larger voltage and a smaller current than the first power supply to the work gap. A switching element is connected between the parallel circuit and the work gap for pulsing power from the parallel circuit.

6 Claims, 3 Drawing Sheets

FIG.1
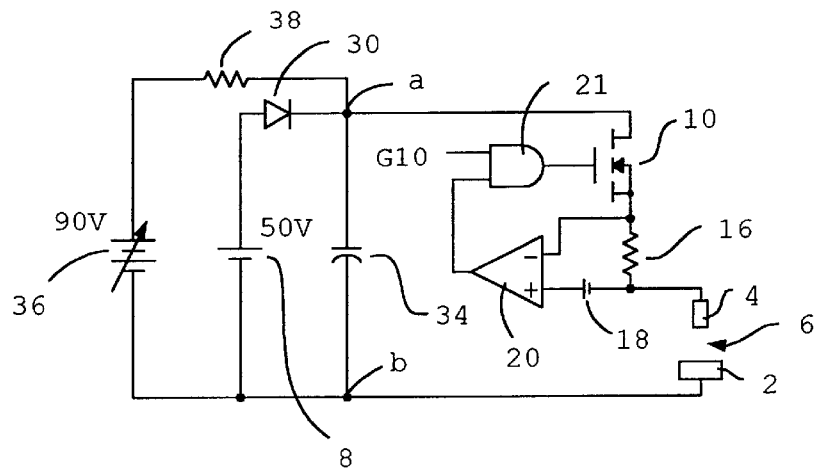
FIG.2A G10
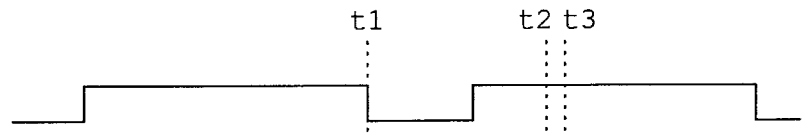
FIG.2B
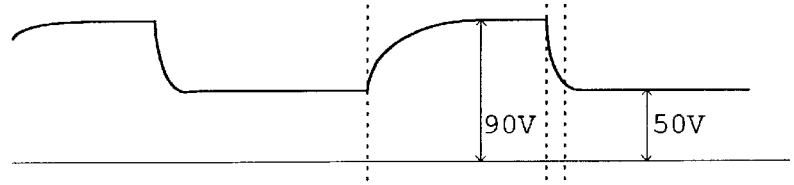
FIG.2C Vgap
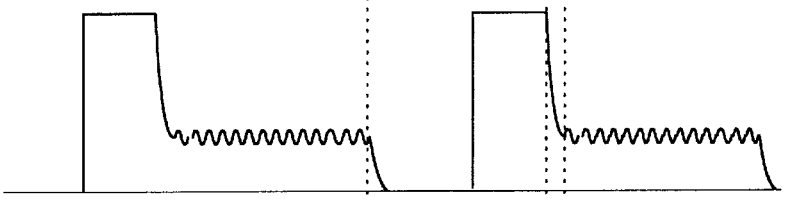
FIG.2D Igap
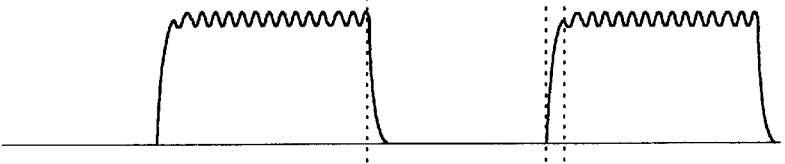

FIG.3
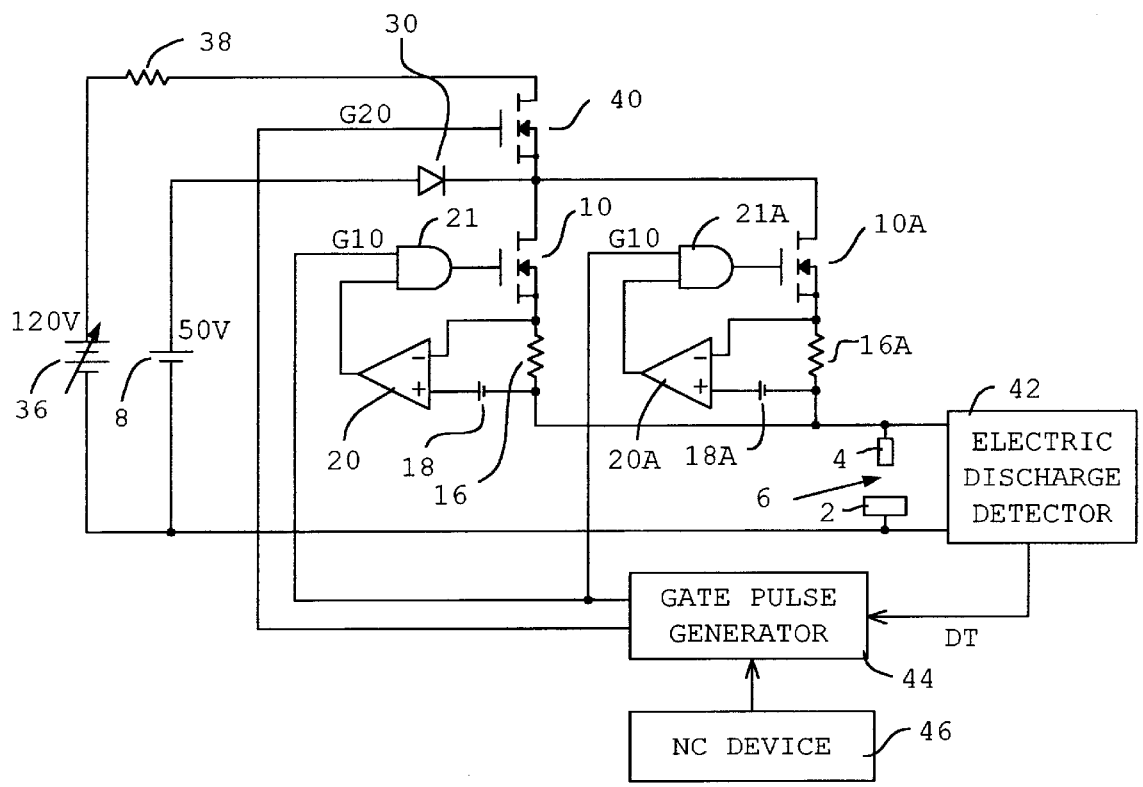
FIG.4A G10 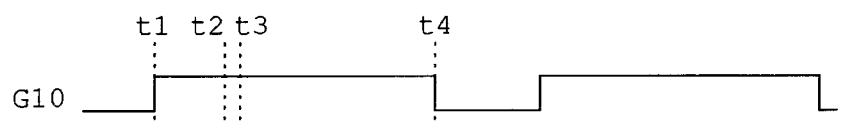
FIG.4B DT 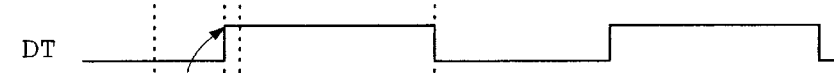
FIG.4C G20 
FIG.4D Vgap 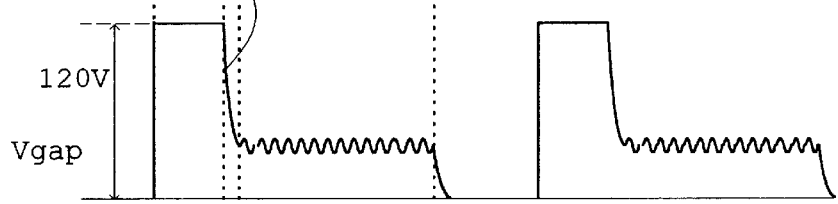
FIG.4E Igap 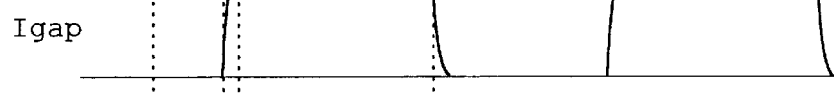

FIG. 5
(PRIOR ART)
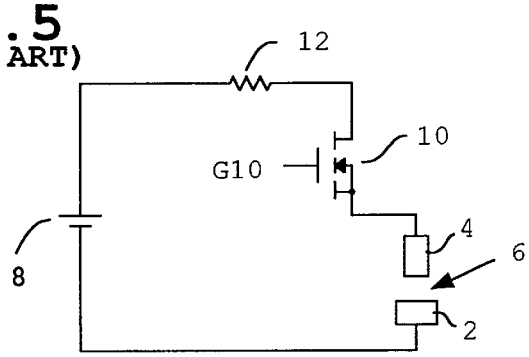
FIG. 6
(PRIOR ART)
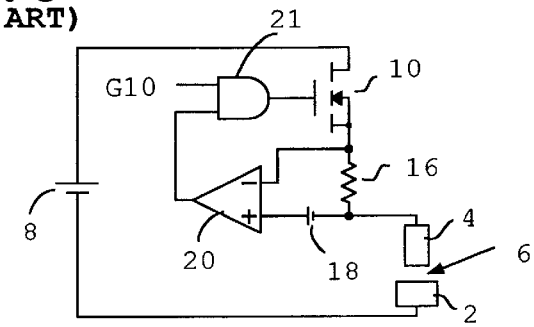
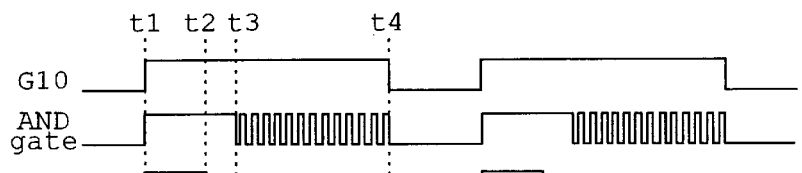
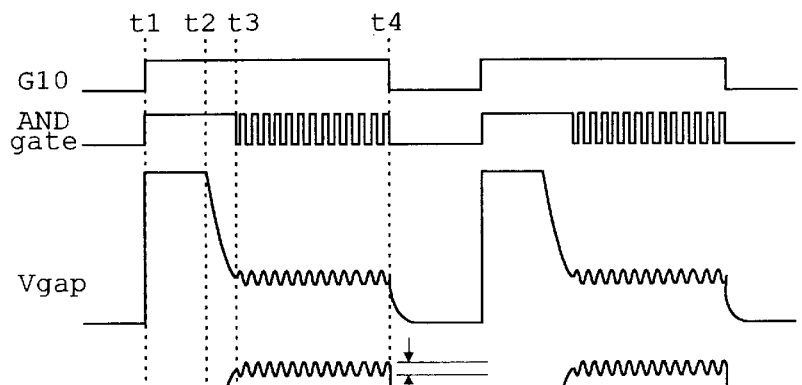
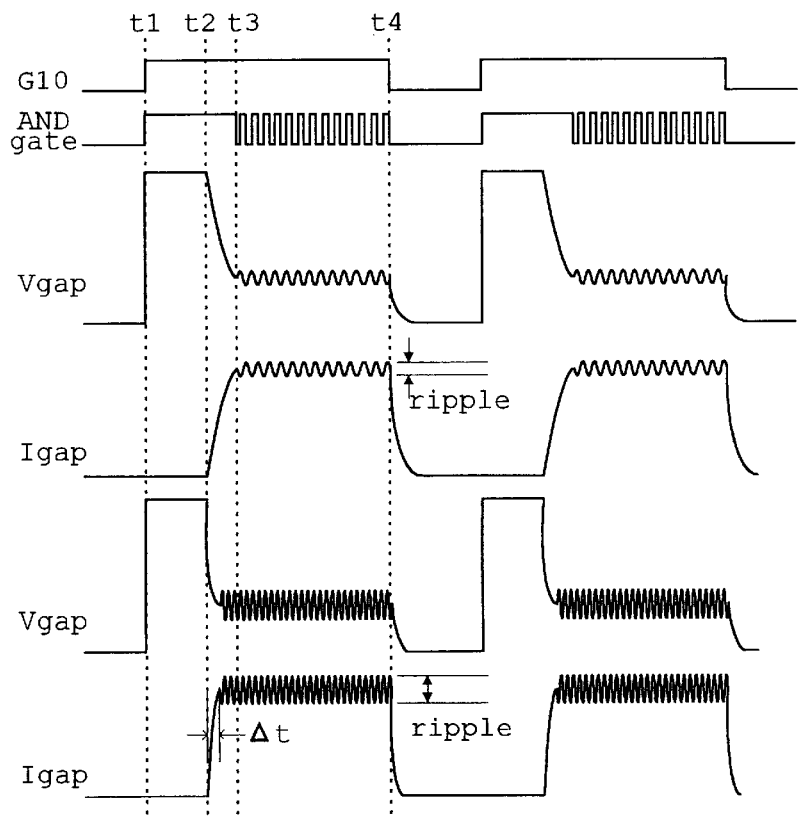

POWER SUPPLY DEVICE FOR ELECTRIC DISCHARGE MACHINE

FIELD OF THE INVENTION

The present invention relates to an electric discharge machine for machining a workpiece by causing an electric discharge in a work gap formed between the workpiece and a tool electrode; more and particularly, the present invention relates to a power supply device for supplying power to the work gap for machining the workpiece.

BACKGROUND OF THE INVENTION

FIG. 5 shows a conventional power supply for an electric discharge machine. A work gap 6 formed between a tool electrode 4 and a conductive workpiece 2 is filled with dielectric fluid, and the size of the work gap 6 is maintained at a fixed microscopic value. A D.C. power supply 8, a current limiting resistance 12 and a switching element 10 are connected in series and to the work gap 6. The switching element 10 is closed when a gate pulse signal G10 is ON, and is open when the gate pulse signal G10 is OFF. The gate pulse signal G10 has a controlled ON time and a controlled OFF time. When voltage is supplied from the D.C. power supply 8 to the work gap 6 by the switching element 10 being closed, the resistance of the dielectric fluid in the work gap 6 is reduced and electric discharge starts. When discharge current flows through the work gap 6, material of the workpiece 2 is removed. The peak value of the discharge current is determined by the current limiting resistance 12. When a set time has elapsed from detection of start of electric discharge, the gate pulse signal G10 becomes OFF and electric discharge is terminated.

U.S. Pat. No. 5,534,675 discloses the circuit of FIG. 6 containing substantially no current limiting resistance or inductance in order to conserve power. The circuit of FIG. 6 comprises a comparator 20 for comparing a voltage at the two ends of a current detecting resistor 16 with a reference voltage 18, and an AND gate 21 for supplying an output that has an ON state when the output from the comparator 20 and the gate pulse signal G10 are both ON to the switching element 10. As shown in FIG. 7A, if the gate pulse signal G10 becomes ON at time t1, a voltage of 50V is supplied from the D.C. power supply 8 to the work gap 6. FIGS. 7C and 7D respectively show a voltage Vgap and a current Igap across the work gap in FIG. 6. When electric discharge starts at time t2, the current Igap starts to flow through the work gap 6, as shown in FIG. 7D. When the current flowing in the current detecting resistor 16 exceeds the set value at time t3, the output of the comparator 20 becomes OFF and the output of the AND gate 21 also becomes OFF. As a result, the switching element 10 is opened, no current at all flows in the current detecting resistor 16, and so the outputs of the comparator 20 and the AND gate 21 both become ON again. As shown in FIG. 7B, the AND gate 21 generates high frequency pulses from time t3 until time t4 when the gate pulse signal G10 goes OFF. During the period from t3 to t4, the pulsed current Igap is maintained at a peak value determined by the reference voltage 18, while the voltage Vgap is physically maintained at 30V.

FIGS. 7E and 7F show voltage Vgap and current Igap across the work gap 6 when a higher voltage D.C. power supply 8 of 90V is used. As shown in FIG. 7F, current pulses Igap reach a set peak value a very short time Δt after time t2 when electric discharge starts. In this way, if the slope of the rising edge of the current pulse Igap is made steeper, the machining rate is increased. However, if the D.C. power supply 8 is made a higher voltage, current ripple become larger and higher in frequency. If ripple of the current pulse Igap is large, it is probable that the current pulse Igap will be terminated before the set time. High frequency ripple has the undesirable effects of increasing heat generated in the switching element 10. Also, at the time of electric discharge a voltage difference between the voltage of the D.C. power supply 8 and the voltage across the work gap 6 is expended on the switching element 10 etc., which means that a higher voltage D.C. power supply 8 outweighs the energy conservation effects of the circuit of FIG. 6.

SUMMARY OF THE INVENTION

An object of the present invention is to provide a power supply for an electric discharge machine that conserves energy and supplies current pulses having a steep rising edge and small ripple to a work gap.

In order to achieve the above and other objects, a first aspect of a power supply device for an electric discharge machine according may comprise a parallel circuit in which a first power supply (8), a second power supply (36) are connected in parallel, the second power supply switchably supplying a larger voltage and a smaller current than the first power supply to the work gap (6).

Another aspect of a power supply device for an electric discharge machine according to the present invention may comprise first and second power supplies (36) and (8) supplies connected in parallel with the work gap (6);

the second power supply applying a larger voltage than the first power supply to the work gap;

switching elements (10, 10A), (40) for controlling current flow from the first and second power supplies to the work gap;

a detector (42) for detecting the occurrence of electric discharge; and a controller (44) connected to the detector for controlling the switching elements so that current flows from the first and second power supplies to the work gap for a time period communicating with the start of electric discharge but current flow from the second power supply to the work gap only for a relatively time period.

Additional objects, advantages and novel features of the invention will be set forth in the description that follows, and will become apparent to those skilled in the art upon reading this description or practicing the invention. The objects and advantages of the invention may be realized and attained by practicing the invention as recited in the appended claims.

BRIEF DESCRIPTION OF THE FIGURES

The accompanying drawings, which are incorporated in, and form a part of the specification, illustrate embodiments of the present invention and, together with the description, serve to explain the principles of the invention. In the drawings:

FIG. 1 is a circuit diagram showing a first power supply according to the present invention;

FIGS. 2A, 2B, 2C and 2D are timing charts showing operation of the power supply of FIG. 1;

FIG. 3 is a circuit diagram showing a second power supply according to the present invention;

FIGS. 4A, 4B, 4C, 4D and 4E are timing charts showing operation of the power supply of FIG. 3;

FIG. 5 is a circuit diagram showing a conventional power supply;

FIG. 6 is a circuit diagram showing a conventional power conserving power supply;

FIGS. 7A, 7B, 7C, 7D, 7E and 7F are timing charts showing operation of the power supply of FIG. 6.

PREFERRED EMBODIMENT OF THE INVENTION

Referring to FIG. 1, a first power supply according to the present invention will now be described. Reference numerals that are the same as those used in FIG. 6 are attached to the same elements.

A series combination of a 50V, D.C. power supply 8 and a diode element 30 for preventing reverse current, a series combination of a variable voltage D.C. power supply 36 and a current limiting resistance 38, and a capacitor 34 are each connected in parallel across node a and node b. Node a is located between the D.C. power supply 8 and a switching element 10, and node b is located between the D.C. power supply 8 and the workpiece 2. The voltage of the D.C. power supply 36 is set to 90V, which is larger than the D.C. power supply 8. The current limiting resistance 38 has a large resistance value of 10 Ω.

With reference to FIGS. 2A, 2B, 2C and 2D, the operation of the power supply of FIG. 1 will now be described. FIGS. 2A, 2B, 2C and 2D respectively show a gate pulse signal G10, voltage of the capacitor 34, voltage Vgap across the work gap 6, and current Igap flowing through the work gap 6 As shown in FIG. 2B, the capacitor 34 is charged by the 90V D.C. power supply 36 from a time t1 when the gate pulse signal G10 becomes OFF until a time t2 when electric discharge starts. From t2 to t3 a voltage higher than the 50V of the D.C. power supply 8 is applied to the work gap 6, which means that the current Igap increases steeply, as shown in FIG. 2D. At time t3 a very short period after t2, the current Igap reaches the set peak value. Since the current limiting resistance 38 is provided between the D.C. power supply 36 and node a, almost all of the current during electric discharge flows from the D.C. power supply 8 to the work gap 6 After time t2, the voltage across the two ends of the capacitor 34 gradually drops to the voltage 50V of the D.C. power supply 8. As a result, the current Igap is maintained at a constant value with a small low frequency ripple.

Next, a second power supply of the present invention will be described with reference to FIG. 3. Reference numerals that are the same as those in FIG. 1 are attached to the same elements.

The second power supply does not include the capacitor 34 of FIG. 1. The voltage of the D.C. power supply 36 is set to 120V. A series circuit of the D.C. power supply 36, current limiting resistance 38 and switching element 40 is connected in parallel with a series combination of the D.C. power supply 8 and the diode 30, and to the work gap 6. The current limiting resistor 38 is different from that in FIG, 1, and is small to the extent that current flowing from the D.C. power supply 36 can reach the set peak value. For example, when the peak value of the current Igap is set to 80A, the resistor 38 is 1.5 Ω. An additional combination of a switching element 10A, a current detecting resistor 16A, a reference voltage 18A, a comparator 20A and an AND gate 21A is connected in parallel with a combination of a switching element 10, a current detecting resistor 16, a reference voltage 18, a comparator 20 and an AND gate 21. An electric discharge detector 42 for detecting electric discharge is provided in parallel with the work gap 6. A gate pulse generator 44 generates gate pulse signals G10 and G20 based on a control signal from an NC device 46 and an output signal DT from the electric discharge detector 42 The gate pulse signal G10 is sent to the switching elements 10 and 10A, while the gate pulse signal G20 is sent to the switching element 40.

The operation of the power supply shown in FIG. 3 will now be described with reference to FIGS. 4A, 4B, 4C, 4D, 4E and 4F.

FIGS. 4A, 4B, 4C, 4D, 4E and 4F respectively show the gate pulse signal G10, the output signal DT from the electric discharge detector 42, the voltage Vgap across the work gap 6, and the current Igap flowing through the work gap 6. As shown in FIG, 4A, and FIG. 4C, when the gate pulse signals G10 and G20 go ON at time t1, a voltage of 120V is supplied from the D.C. power supply 36 to the work gap 6. When electric discharge starts at time t2 the current Igap starts to flow through the work gap 6. Because the output voltage of the D.C. power supply 36 is high, the current Igap rises rapidly and reaches the peak value at time t3. The gate pulse signal G20 goes OFF a time td after time t2 when the output signal of the electric discharge detector 42 goes ON. Time td that has been set inside the gate pulse generator 44 is a time required for the current Igap to reach the set peak value. Accordingly, time td is preferable an elapsed time from t2 to t3, and can be prolonged according to the set current peak At time t4, the gate pulse signal G10 goes OFF and switching elements 10 and 10A are opened, and electric discharge is terminated, The duration from t2 to t4 is set inside the gate pulse generator 44 in response to a command from the NC device 46, After time td has elapsed from time t2, the connection between the D.C. power supply 36 and the work gap 6 is broken, as a result of which the current Igap is maintained at a set value with a lower and smaller in frequency ripple.

The foregoing description of preferred embodiments of the invention have been presented for purposes of illustration and description. It is not intended to be exhaustive or to limit the invention to the precise form enclosed, and obviously many modifications and variations are possible in light of the above teaching. It is intended that the scope of the invention be defined by the claims appended hereto.

What is claimed is:

1. A power supply device for an electric discharge machine for supplying power to a work gap formed between a work piece and a tool electrode, said power supply device comprising:

a parallel circuit having a first power supply, a second power supply and a capacitor connected in parallel, the second power supply supplying a larger voltage and a smaller current than the first power supply to the work gap;

a switch connected between the parallel circuit and the work gap;

a gate pulse signal generator for generating a gate pulse signal having an ON time and an OFF time;

an essentially non-inductive current detector for detecting current flowing through the work gap;

a comparator for comparing the detected work gap current with a reference value; and a gate for turning on the switch when the gate pulse signal is ON and the detected work gap current is smaller than the reference value.

2. The power supply according to the claim 1, wherein the parallel circuit includes a current limiting resistance connected in series with the second power supply.

3. The power supply device according to the claim 1, wherein the first power supply supplies a larger voltage than 30V.

4. A power supply device for an electric discharge machine for supplying power to a work gap formed between a work piece and a tool electrode, said power supply comprising:

- a parallel circuit having a first power supply and a second power supply connected in parallel, the second power supply supplying a larger voltage than the first power supply to the work gap;
- a first switch connected between the parallel circuit and the work gap;
- a second switch connected in series with the second power supply in said parallel circuit;
- a gate pulse signal generator for generating a gate pulse signal having an ON time and an OFF time;
- an essentially non-inductive current detector for detecting current flowing through the work gap;
- a comparator for comparing the detected work gap current with a reference value;
- a gate for turning on the first switch when the gate pulse signal is ON and the detected work gap current is smaller than the reference value;
- wherein the second switch allows current to flow from the second power supply through the work gap for a time period during which the current flowing through the work gap increases to a peak value.

5. The power supply device according to the claim 4, wherein the parallel circuit further includes a current limiting resistance connected in series to the second power supply and the second switch.

6. The power supply device according to the claim 4, wherein the first power supply supplies a larger voltage than 30V.

* * * * *